July 8, 1969  J. J. MANCUSI, JR  3,454,288
PRESSURE-BALANCED SWIVEL PIPE COUPLING
Filed Dec. 22, 1967

INVENTOR
JOSEPH J. MANCUSI, JR.

United States Patent Office 3,454,288
Patented July 8, 1969

3,454,288
PRESSURE-BALANCED SWIVEL PIPE COUPLING
Joseph J. Mancusi, Jr., Bristol, Conn.
(P.O. Box 26, Terryville, Conn. 06786)
Filed Dec. 22, 1967, Ser. No. 692,779
Int. Cl. F16l *17/00, 33/16*
U.S. Cl. 285—98                    2 Claims

ABSTRACT OF THE DISCLOSURE

A fluid conduit swivel joint construction provides hydraulic loadings which cancel each other. Three seals arranged in the housing about the periphery of the ball create appropriately dimensioned piston areas. Two seals are at opposite ends of the housing and the third is offset from a center point. The joint surfaces intermediate the two closest seals vent to atmosphere; the joint surfaces intermediate the two farthest vent to the internal conduit.

*Introduction*

This invention relates to swivel joints and more particularly to swivel joints providing through fluid connections.

*Prior art problem*

Existing fluid coupling swivel joints are imbalanced and have a resistance to swiveling action which varies directly with pressure and materially affects the life of the swivel.

*Objects of the invention*

An object of the invention is to provide a fluid conduit swivel joint construction in which bearing loading is held to an absolute minimum.

A further object of the invention is to provide a fluid conduit swivel joint construction wherein the resistance to swiveling does not substantially increase with increases in fluid pressure.

Another object of the invention is to provide a fluid conduit swivel joint construction which is of long life.

*The invention*

An advantageous arrangement of three seals effects a pressure balanced loading of the board ball of a fluid conduit swivel joint within its housing. Three seals are arranged about the ball to define appropriately dimensioned piston areas. Two seals are at opposite ends of the ball and the third is offset from the center point. The joint surfaces intermediate the adjacent seals farthest apart vents to the internal conduit; the joint surfaces intermediate the adjacent seals closest together vent to atmosphere.

Such construction results in the piston areas created by the two seals to the one side of the center point acting to push the ball towards the other side. The piston area created by the other seal may equal the sum of the piston areas created by the other two seals so that the same effective fluid pressure applied thereto may exert an equal force in the other direction to establish an essentially balanced pressure loading of the ball within the housing. Swiveling of the ball within the housing does not materially affect the loading situation.

An advantage of the invention resides in the reduced mechanical loads. Since friction is limited to that introduced by the sealing material, the ball in the swivel joint may readily rotate within its housing, thus avoiding flexure loading. The friction free loading also leads to longer life and, hence, lower cost.

These and other objects, features, and advantages of the invention will become apparent from a reading of the following description of a proposed embodiment of the invention, when considered with accompanying drawings, wherein.

Figure 1:
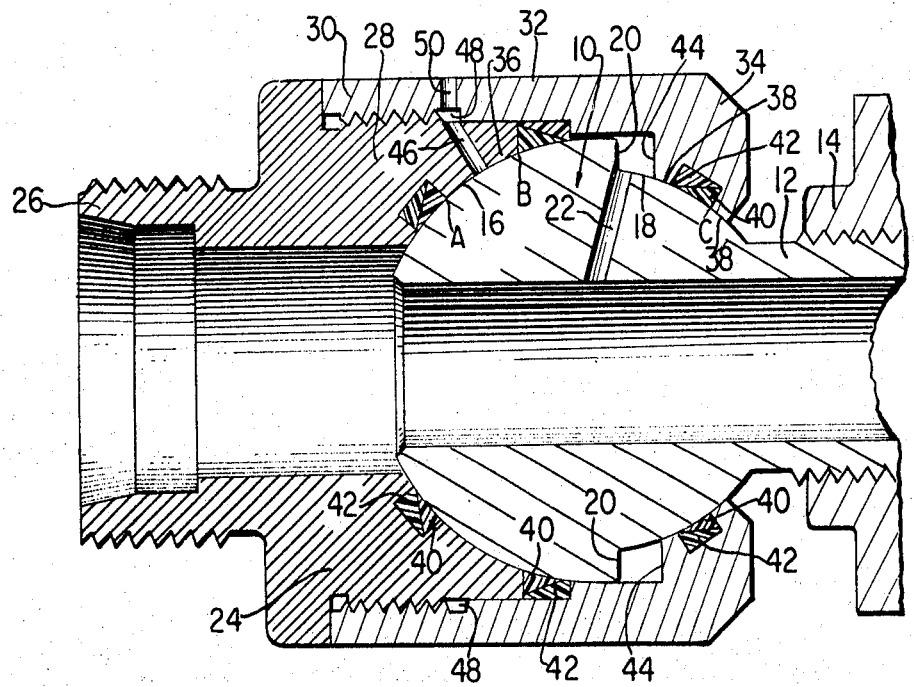
FIGURE 1 is a view in longitudinal cross-section through a swivel joint constructed according to the invention.

Referring now to FIGURE 1; a fluid-conduit swivel-joint includes a bored ball or generally spherical member 10 formed with a threaded extension 12 for attachment to a suitable mechanical element 14. The ball 10 has a first or enlarged spherical surface 16 constituting the larger part of the ball, and a second or reduced spherical surface 18 concentric with the first spherical surface 16. A shoulder 20 formed at the inner ends of the spherical surfaces 16 and 18 serves to limit the amount of rotation of the ball within its cooperating housing. A conduit 22 transmits the fluid pressure that may obtain within bored ball 10 to the spherical surfaces in the area of the shoulder 20.

The housing of the swivel joint includes a bored first part 24 having a threaded end 26 for connection to a mechanical element (not shown). The other end 28 of the bored first part 24 fixedly secures the threaded end 30 of the somewhat cylindrical second part 32 of the housing. The other end 34 of the housing second part 32 is offset inwardly.

The ball 10 is held within the assembled housing by a cooperating face 36 on the other end 28 of the bored first part 24 and a cooperating face 38 on the other end 34 of the second part 32. The surface 36 has the same radius as the enlarged spherical surface 16 of the ball 10. The surface 38 has the same radius as reduced spherical surface 18 and is concentric therewith. Surfaces 36 and 38 are separated from each other by the central portion of the somewhat cylindrical second part 32 of the housing. The internal diameter of the central portion corresponds with the external diameter of the enlarged spherical surface 16 of the ball 10. The offset 34 is so located with respect to the central portion and the shoulder 20 of the ball as to accommodate the desired amount of rocking of the ball within the housing before the shoulder 20 strikes the offset 34.

The pressure balanced loading of the ball 10 within the housing of the fluid conduit swivel joint derives from effecting seals at circumferential lines A, B, and C. Each seal consists of an essentially frictionless ring 40 formed of a material such as Teflon and essentially triangular in cross-section.

Each seal is seated in its annular groove, generally rectangular in cross-section, formed in the housing. A groove in the cooperating face 36 of the other end 28 of the housing part 24 seats the rings for the seal A. A groove formed between the end 28 and a shoulder 44 of the cylindrical part 32 accommodates the rings for the seal B. A groove in the cooperating face 38 of the other end 34 of the second part 32 contains the rings for seal C.

The two rings of each seal have complementary triangular cross-sections so that seated, they fill the annular groove rectangular in cross-section. The frictionless ring 40 is outermost in the groove and faces a relatively movable surface. The elastomeric ring 42 lies behind the ring 40 in the groove. If higher pressure obtains at the side of the groove having the thinner frictionless ring 40 edge and the thicker elastomeric ring 42 edge, the elastomer ring 42 will deform forcing the thicker edge of the frictionless ring 40 on the other side of the groove outward into sealing engagement with the opposing surface.

A seal obtains at point A at the upper right hand corner (FIGURE 1) of the corresponding groove because the inboard corner is subjected to the fluid pressure obtaining in the bores of the housing part 24 and ball 10. The fluid pressure communicates to the seal between the opposing or joint surface 36 and 16 of the housing part 24 and ball 10, respectively. Atmospheric pressure obtains at the upper right hand corner of the groove because a vent 46 formed in the housing first part end 28 communicates the enlarged spherical surface 36 in the area between the seals A and B with an annular groove 48 formed in the housing second part end 30 and closed off by the housing first part end 28. The annular groove communicates with the outside of the housing through a vent 50 formed in the housing second part end 30.

A seal obtains at point B because the fluid pressure in the bore of the ball 10 is transmitted to the periphery of the ball through the vent 22. Fluid pressure extends around the ball shoulder 22 and the housing second part shoulder 44 to compress the elastomeric ring 42 inboard and to the left and force the Teflon ring 40 to the lower right corner of the annular groove to define a seal at B. The left side of that annular groove communicates to the atmospheric pressure obtaining between the joint surfaces 16 and 36 via vent 46.

A seal exists at point C because the fluid pressure conveyed through the vent 22 passes between the mating or joint surfaces 18 of the ball and 38 of the housing second part offset 34 to compress the elastomeric ring 42 to the right and inboard to force the Teflon ring 40 similarly and effect the annular seal at C. Atmospheric pressure exists to the right of point C by virtue of the mating surfaces 18 and 38 opening to the outside of the housing at their right hand ends.

Since fluid pressure exists about the periphery of the ball 10 over areas limited by the seals A, B, and C, it will be evident that pressures are exerted on the ball tending to urge it in particular directions. Seal A defines the outer area limits of the ambient fluid pressure acting on the left hand end of the ball 10. The inner area limits are determined by the edge of the ball about its bore. There thus obtains an annulus area over which fluid pressure forces effectively balance out to force the ball to the right as may be readily seen in FIGURE 2.

Figure 2:
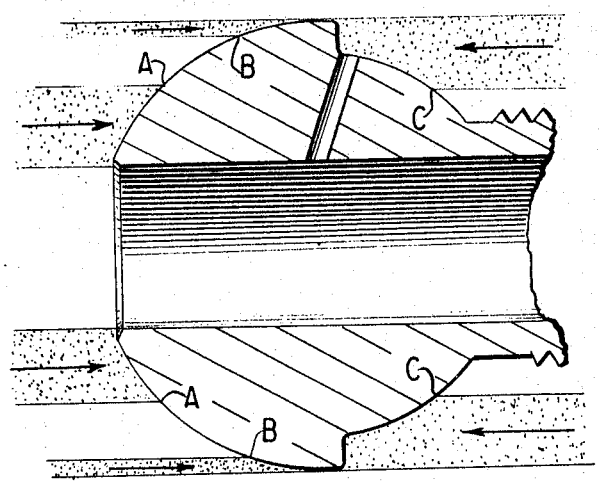
FIGURE 2 is a schematic view demonstrating the balanced force loading on the ball of a swivel joint according to FIGURE 1.

Seal B defines the inboard area limits of the ambient fluid pressure obtaining to the left of the center of the periphery of the ball 10 by virtue of the vent 22. The outboard limits of the area, fluid pressure upon which acts to force the ball 10 to the right, may be said to be the line defined by the maximum diameter of the ball. As best seen in FIGURE 2, this results in a narrow annulus of enlarged diameter which may be considered a piston area upon which fluid pressure in the bore of the ball acts to force the ball to the right.

Seal C fixes the inboard limits of the area upon which the ambient fluid pressure acts to urge the ball 10 to the left. The outboard limits of the area is the line defined by the maximum area of the ball. As seen in FIGURE 2, this results in an annulus piston area of considerable size. It may be dimensioned to result in forces which balance those generated as a result of seals A and B.

Ball surfaces 16 and 18 and housing surfaces 36 and 38 are hard finished with chrome plate or hard anodize to provide superior surface conditions which minimize deterioration.

It can be seen that a fluid swivel joint construction according to the instant invention has essentially no bearing load due to fluid pressure. Torque is essentially independent of the fluid pressure passing through. Pressure impulses have essentially no effect.

In addition to easy flexing, the advantage of greatly enhanced cycle life obtains. Materials may be used which make possible less expensive manufacture. Surface deterioration and resultant rapid seal wear are postponed; hence torque increases, due to aging wear, do not arise to destroy the mounting provision.

While a particular embodiment has been disclosed, it will be obvious that the invention lends itself to many embodiments.

What is claimed is:

1. In a fluid conduit swivel joint construction, a generally spherical one-piece member having a bore therethrough and only a first enlarged continuous spherical surface and a second reduced continuous spherical surface of less radius but concentric with the enlarged spherical surface, a housing having generally spherical surfaces for seating said member and having a bore for communicating with said member bore, grooves formed in the housing near the ends of said member and at an intermediate point seals in said grooves for responding to fluid pressure in said bores to develop piston-like areas operative to cancel the fluid pressure loading of the member with respect to the housing, said grooves and seals being so arranged that the intermediate seal lies closer to one end seal than the other and opposite said enlarged spherical surface, and means for communicating the bore of said spherical member with the spherical surfaces between said farthest apart end and intermediate seals.

2. In a fluid conduit swivel joint construction, a ball having a bore therethrough and an extension at one end and an enlarged continuous spherical surface extending from the edge of the bore past a midpoint and a reduced continuous spherical surface of less radius but concentric with the enlarged spherical surface and extending from near said enlarged spherical surface past said midpoint to said extension, a housing for seating said ball and including a first part having a bore for communicating with the ball bore and a spherical surface for cooperating with the ball enlarged spherical surface and a second part threadedly secured to the first to secure the ball within the housing and having an offset formed with a spherical surface for cooperating with the ball reduced spherical surface, an annular groove formed in the housing first part spherical surface, an annular groove formed in the housing second part spherical surface, an annular groove formed in the housing at the juncture of the first part and the second part, a seal in each groove consisting of an elastomeric ring in the bottom of each groove and an overlying frictionless ring for engaging a ball surface, a vent for communicating the ball bore with its periphery adjacent the first and second spherical surfaces and between a pair of grooves, and a vent for communicating the spherical surfaces between the other pair of grooves to atmosphere.

References Cited

UNITED STATES PATENTS

| 1,265,233 | 5/1918  | Miller _____ 277—190   |
| 2,421,691 | 6/1947  | Gibson et al. _____ 285 |
| 2,816,582 | 12/1957 | Von Sneidern _____ 277—190 X   |
| 3,232,806 | 6/1967  | Smith et al. _____ 277—190 X  |

FOREIGN PATENTS

| 1,015,649 | 9/1957 | Germany.       |
| 996,228   | 6/1965 | Great Britain. |

THOMAS F. CALLAGHAN, *Primary Examiner.*

U.S. Cl. X.R.
277—190; 285—261